US011105223B2

(12) United States Patent
Ganiger et al.

(10) Patent No.: US 11,105,223 B2
(45) Date of Patent: Aug. 31, 2021

(54) SHAPE MEMORY ALLOY REINFORCED CASING

(71) Applicant: General Electric Company, Schenectady, NY (US)

(72) Inventors: Ravindra Shankar Ganiger, Bangalore (IN); Praveen Sharma, Bangalore (IN); Shivam Mittal, Bangalore (IN); Bhujabal Prashant Mahadeo, Bangalore (IN); Weize Kang, Mason, OH (US); Richard Schmidt, Loveland, OH (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 16/535,254

(22) Filed: Aug. 8, 2019

(65) Prior Publication Data
US 2021/0040865 A1    Feb. 11, 2021

(51) Int. Cl.
*F01D 25/16*    (2006.01)
*F02C 7/36*    (2006.01)
(Continued)

(52) U.S. Cl.
CPC .......... *F01D 25/164* (2013.01); *F01D 25/18* (2013.01); *F02C 7/06* (2013.01); *F02C 7/36* (2013.01);
(Continued)

(58) Field of Classification Search
CPC ........ F01D 25/164; F01D 25/18; F16C 27/04; F16C 35/077; F16C 19/26; F16C 19/06;
(Continued)

(56) References Cited

U.S. PATENT DOCUMENTS 2,445,661 A    7/1948  Constant et al.
2,602,009 A    7/1952  Barlow et al.
(Continued)

FOREIGN PATENT DOCUMENTS

CA    2841592 A1    10/2014
CA    2861292 A1    6/2015
(Continued)

OTHER PUBLICATIONS

Stebner, Development, Characterization, and Application of Ni19.5Ti50.5Pd25Pt5 High-Temperature Shape Memory Alloy Helical Actuators, Engineering, Aerospace, Thesis, Dec. 2007, 110 Pages.
(Continued)

*Primary Examiner* — Mark A Laurenzi
*Assistant Examiner* — Mickey H France
(74) *Attorney, Agent, or Firm* — Dority & Manning, P.A.

(57) ABSTRACT

A casing for a bearing of a gas turbine engine includes a shaft extending along an axial direction. The casing includes an attachment feature at a radially outermost portion of the casing. The attachment feature is configured to be coupled to a static frame of the gas turbine engine. The casing further includes a plurality of support arms extend from the attachment feature to a radially innermost portion of the casing. At least one support arm of the plurality of support arms defines an internal cavity. Further, the radially innermost portion of the casing is configured to be coupled to an outer race of the bearing. The casing additionally includes a reinforcing member housed at least partially within the internal cavity of at least one support arm. Moreover, the reinforcing member includes a shape memory alloy material.

20 Claims, 9 Drawing Sheets

(51) Int. Cl.
| | |
|---|---|
| *F01D 25/18* | (2006.01) |
| *F03G 7/06* | (2006.01) |
| *F02C 7/06* | (2006.01) |
| *F16C 27/04* | (2006.01) |
| *F16C 35/077* | (2006.01) |
| *F16C 19/26* | (2006.01) |
| *F16C 19/06* | (2006.01) |

(52) U.S. Cl.
CPC .............. *F03G 7/065* (2013.01); *F16C 19/06* (2013.01); *F16C 19/26* (2013.01); *F16C 27/04* (2013.01); *F16C 27/045* (2013.01); *F16C 35/077* (2013.01); *F05D 2240/52* (2013.01); *F05D 2240/54* (2013.01); *F05D 2260/96* (2013.01); *F05D 2300/505* (2013.01); *F16C 2202/28* (2013.01); *F16C 2360/23* (2013.01)

(58) Field of Classification Search
CPC ................ F16C 27/045; F16C 2360/23; F16C 2202/28; F02C 7/36; F02C 7/06; F03G 7/065; F05D 2240/54; F05D 2260/96; F05D 2300/505; F05D 2240/52
USPC ........ 60/527–529; 310/306, 307; 415/33, 34, 415/110, 111, 132, 142, 170.1, 180, 229
See application file for complete search history.

(56) References Cited

U.S. PATENT DOCUMENTS

| | | | |
|---|---|---|---|
| 4,451,110 A | 5/1984 | Forestier et al. | |
| 4,496,252 A | 1/1985 | Horler et al. | |
| 4,676,667 A | 6/1987 | Komatsu et al. | |
| 5,088,840 A | 2/1992 | Radtke | |
| 5,160,233 A | 11/1992 | McKinnis | |
| 5,320,134 A | 6/1994 | Singh | |
| 5,366,254 A | 11/1994 | Tucchio et al. | |
| 5,974,782 A | 11/1999 | Gerez | |
| 6,009,701 A | 1/2000 | Freeman et al. | |
| 6,082,959 A | 7/2000 | Van Duyn | |
| 6,099,165 A | 8/2000 | Tremaine | |
| 6,109,022 A | 8/2000 | Allen et al. | |
| 6,240,719 B1 | 6/2001 | Vondrell et al. | |
| 6,325,546 B1 | 12/2001 | Storace | |
| 6,428,634 B1 | 8/2002 | Besselink et al. | |
| 6,491,497 B1 | 12/2002 | Allmon et al. | |
| 6,494,032 B2 | 12/2002 | Udall et al. | |
| 6,783,319 B2 | 8/2004 | Doerflein et al. | |
| 6,796,408 B2 | 9/2004 | Sherwin et al. | |
| 6,799,416 B2 | 10/2004 | Plona et al. | |
| 7,004,047 B2 | 2/2006 | Rey et al. | |
| 7,097,413 B2 | 8/2006 | VanDuyn | |
| 7,195,444 B2 | 3/2007 | Brault et al. | |
| 7,216,831 B2 | 5/2007 | Wood | |
| 7,288,326 B2 | 10/2007 | Elzey et al. | |
| 7,404,678 B2 | 7/2008 | Plona | |
| 7,448,808 B2 | 11/2008 | Bouchy et al. | |
| 7,669,799 B2 | 3/2010 | Elzey et al. | |
| 7,749,341 B2 | 7/2010 | Noebe et al. | |
| 7,832,193 B2 | 11/2010 | Orlando et al. | |
| 7,926,259 B2 | 4/2011 | Orlando et al. | |
| 8,100,638 B2 | 1/2012 | Udall | |
| 8,128,339 B2 | 3/2012 | Kondo et al. | |
| 8,136,999 B2 | 3/2012 | Mons et al. | |
| 8,167,531 B2 | 5/2012 | Mollmann et al. | |
| 8,209,834 B2 | 7/2012 | Mons et al. | |
| 8,246,255 B2 | 8/2012 | Raberin et al. | |
| 8,267,650 B2 | 9/2012 | Alam et al. | |
| 8,291,710 B2 | 10/2012 | Webster | |
| 8,337,090 B2 * | 12/2012 | Herborth | F16C 27/04 384/535 |
| 8,371,802 B2 | 2/2013 | Udall | |
| 8,403,634 B2 | 3/2013 | Arness et al. | |
| 8,409,691 B1 | 4/2013 | Henry et al. | |
| 8,430,622 B2 | 4/2013 | Webster et al. | |
| 8,434,293 B2 | 5/2013 | Widdle, Jr. et al. | |
| 8,662,756 B2 | 3/2014 | Care et al. | |
| 8,814,097 B2 | 8/2014 | Schnitzer | |
| 8,834,095 B2 | 9/2014 | Davis | |
| 8,945,325 B2 | 2/2015 | Everhart et al. | |
| 8,986,146 B2 | 3/2015 | Gallet | |
| 8,992,161 B2 | 3/2015 | Hindle et al. | |
| 9,140,137 B2 | 9/2015 | Mayer et al. | |
| 9,180,982 B2 | 11/2015 | Baghasarian | |
| 9,796,581 B2 | 10/2017 | Landais et al. | |
| 2006/0269357 A1 | 11/2006 | Webb | |
| 2008/0181763 A1 | 7/2008 | Webster et al. | |
| 2008/0213062 A1 | 9/2008 | Johnson et al. | |
| 2009/0148274 A1 | 6/2009 | Kostka et al. | |
| 2009/0185768 A1 | 7/2009 | Mons et al. | |
| 2010/0011493 A1 | 1/2010 | Wiig et al. | |
| 2011/0150378 A1 | 6/2011 | Care et al. | |
| 2012/0056005 A1 | 3/2012 | Webster | |
| 2013/0266252 A1 * | 10/2013 | Murakami | F16C 19/26 384/477 |
| 2013/0272871 A1 * | 10/2013 | Webster | F04D 27/0292 415/229 |
| 2013/0324343 A1 | 12/2013 | Gallet | |
| 2015/0144256 A1 | 5/2015 | Fabre et al. | |
| 2016/0229519 A1 | 8/2016 | Dilligan et al. | |
| 2017/0234157 A1 | 8/2017 | Khan et al. | |
| 2018/0112554 A1 | 4/2018 | Ghosh et al. | |
| 2018/0112672 A1 | 4/2018 | Ganiger et al. | |
| 2018/0298822 A1 | 10/2018 | Ac et al. | |
| 2019/0293119 A1 * | 9/2019 | Boller | F16C 17/04 |

FOREIGN PATENT DOCUMENTS

| | | |
|---|---|---|
| CN | 103244276 A | 8/2013 |
| EP | 1130243 A2 | 9/2001 |
| EP | 1344896 A1 | 9/2003 |
| EP | 2339131 A1 | 6/2011 |
| EP | 3115551 A1 | 1/2017 |
| FR | 2888621 A1 | 1/2007 |
| FR | 2938874 A1 | 11/2008 |
| WO | WO2010/001716 A1 | 1/2010 |
| WO | WO2017/205315 A1 | 11/2017 |

OTHER PUBLICATIONS

Barbarino et al., A review on shape memory alloys with applications to morphing aircraft, Smart Materials and Structures, vol. 23, Issue: 6, Apr. 10, 2014, 19 Pages.

Wischt et al., Variable Stiffness Technique for Turbomachinery using Shape Memory Alloys, 56th AIAA/ASCE/AHS/ASC Structures, Structural Dynamics, and Materials Conference, Florida, Jan. 2015, 13 Pages.

Co-Pending Application Serial No. 201640122484 filed Jun. 30, 2016.

Co-Pending U.S. Appl. No. 15/811,169, filed Nov. 13, 2017.

Co-Pending U.S. Appl. No. 15/823,631, filed Nov. 28, 2017.

* cited by examiner

SHAPE MEMORY ALLOY REINFORCED CASING

FIELD

The present subject matter relates generally to a support assembly for a bearing in a gas turbine engine, or more particularly to a casing of the support assembly including a shape memory alloy material reinforcing member.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding the fan assembly including the fan blades.

With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

During normal engine operation, a support assembly may be provided to support each bearing of the gas turbine engine. For instance, a ball bearing assembly can be provided to retain the axial position of the HP shaft (aka HP spool), and a roller bearing assembly can be provided to act to provide radial damping of the fan/rotor system. A traditional design approach consisting of an axial support arm housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, under no-oil conditions, as well as during conditions in which the rotor assemblies are subjected to a large amount of dynamic forces, the squeeze film dampers may not provide a desired amount of variable damping that can change with respect to the dynamic forces. Bearing assemblies may also generally include radial support arms, such as within the roller bearing assembly, to further dampen loads that may damage the bearing. However, such radial support arms may not allow for a large variation in stiffness and may be relatively large.

As such, a need exists for an improved casing for a support assembly of a gas turbine engine that provides improved damping as well as damping in a no-oil condition.

BRIEF DESCRIPTION

Aspects and advantages will be set forth in part in the following description, or may be obvious from the description, or may be learned through practice of the invention.

In one aspect, the present subject matter is directed to a casing for a bearing of a gas turbine engine including a shaft extending along an axial direction. The casing includes an attachment feature at a radially outermost portion of the casing. The attachment feature is configured to be coupled to a static frame of the gas turbine engine. The casing further includes a plurality of support arms extending from the attachment feature to a radially innermost portion of the casing. At least one support arm of the plurality of support arms defines an internal cavity. Further, the radially innermost portion of the casing is configured to be coupled to an outer race of the bearing. The casing additionally includes a reinforcing member housed at least partially within the internal cavity of at least one support arm. Moreover, the reinforcing member includes a shape memory alloy material.

In one embodiment, one or more support arms of the plurality of support arms may include an axial rib portion. In such an embodiment, the internal cavity of the support arm(s) may be defined at least partially within the axial rib portion. In another embodiment, one or more support arms of the plurality of support arms may include a radial rib portion extending from the axial rib portion to the radially innermost portion of the casing. In a further embodiment, the plurality of support arms may include one or more axially forward support arms extending from an axially forward face of the attachment feature and one or more axially aft support arms extending from an axially aft face of the attachment feature. In such an embodiment, each of the axially forward and axially aft support arms may include axial rib portions axially aligned. In a further such embodiment, the internal cavity may be defined through at least a portion of the axial rib portion of at least one of the axially forward support arms or axially aft support arms. In another such embodiment, the internal cavity may be defined through the axial rib portion of the axially forward support arm, the attachment feature, and the axial rib portion of the axially aft support arm.

In a further embodiment, each of the plurality of support arms may include an axially forward support arm extending from an axially forward face of the attachment feature or an axially aft support arm extending from an axially aft face of the attachment feature. Each of the axially forward support arms and axially aft support arms may include axial rib portions axially aligned. Further, each pair of axially forward support arms and axially aft support arms may define an internal cavity extending through the axial rib portion of the axially forward support arm, the attachment feature, and the axial rib portion of the axially aft support arm. In one such embodiment, the casing may further include a plurality of reinforcing members. Moreover, each reinforcing member of the plurality of reinforcing members may be at least partially housed within the internal cavity of each pair of axially forward support arms and axially aft support arms.

In an additional embodiment, the casing may further include a deflection limiter coupled to the radially innermost portion of the casing. Moreover, the deflection limiter may include a shape memory alloy material. In another embodiment, the reinforcing member may be prestressed.

In another aspect, the present subject matter is directed to a support assembly for a bearing of a gas turbine engine including a shaft extending along an axial direction. The support assembly includes an outer race positioned radially exterior to the bearing such that the outer race supports the bearing. The support assembly further includes a casing positioned radially exterior to the outer race and supporting the outer race. The casing includes an attachment feature at a radially outermost portion of the casing. The attachment feature is coupled to a static frame of the gas turbine engine. The casing further includes a plurality of support arms extending from the attachment feature to a radially innermost portion of the casing. One or more support arms of the plurality of support arms define an internal cavity. Further, the radially innermost portion of the casing is coupled to the outer race of the bearing. The casing additionally includes a reinforcing member housed at least partially within the internal cavity of one or more support arms. Moreover, the reinforcing member includes a shape memory alloy material.

In one embodiment, the support assembly may further include a squeeze film damper. In another embodiment the bearing may include at least one of a thrust bearing or a roller bearing. In a further embodiment, the casing may further include a deflection limiter coupled between the radially innermost portion of the casing and the outer race. Moreover, the deflection limiter may include a shape memory alloy material.

In an additional embodiment, each of the plurality of support arms may include an axially forward support arm extending from an axially forward face of the attachment feature or an axially aft support arm extending from an axially aft face of the attachment feature. Further, each of the axially forward support arms and axially aft support arms may include axial rib portions axially aligned. Moreover, each pair of axially forward support arms and axially aft support arms may define an internal cavity extending through the axial rib portion of the axially forward support arm, the attachment feature, and the axial rib portion of the axially aft support arm. In one such embodiment, the casing may further include a plurality of reinforcing members. In such an embodiment, each reinforcing member of the plurality of reinforcing members may be at least partially housed within the internal cavity of each pair of axially forward support arms and axially aft support arms. It should be further understood that the support assembly may further include any of the additional features as described herein.

In another aspect, the present subject matter is directed to a method of forming a casing for a gas turbine engine. The method includes forming a body of the casing including an attachment feature at a radially outermost portion of the casing and a plurality of support arms extending from the attachment feature to a radially innermost portion of the casing. The method further includes forming an internal cavity within at least one support arm of the plurality of support arms. The method further includes inserting a reinforcing member within the internal cavity of the at least one support arm of the plurality of support arms. Additionally, the reinforcing member includes a shape memory alloy material.

In one embodiment, the method may further include forming an internal cavity within each support arm of the plurality of support arms. The method may further include inserting a reinforcing member within the internal cavity of each support arm of the plurality of support arms. In such an embodiment, each reinforcing member may include a shape memory alloy material. In another embodiment, the method may further include forming a curved reinforcing member. In such an embodiment, inserting the curved reinforcing member within the internal cavity may prestress the reinforcing member. In an additional embodiment, the method may further include coupling a deflection limiter to the radially innermost portion of the casing. Additionally, the deflection limiter may include a shape memory alloy material. It should be further understood that the method may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
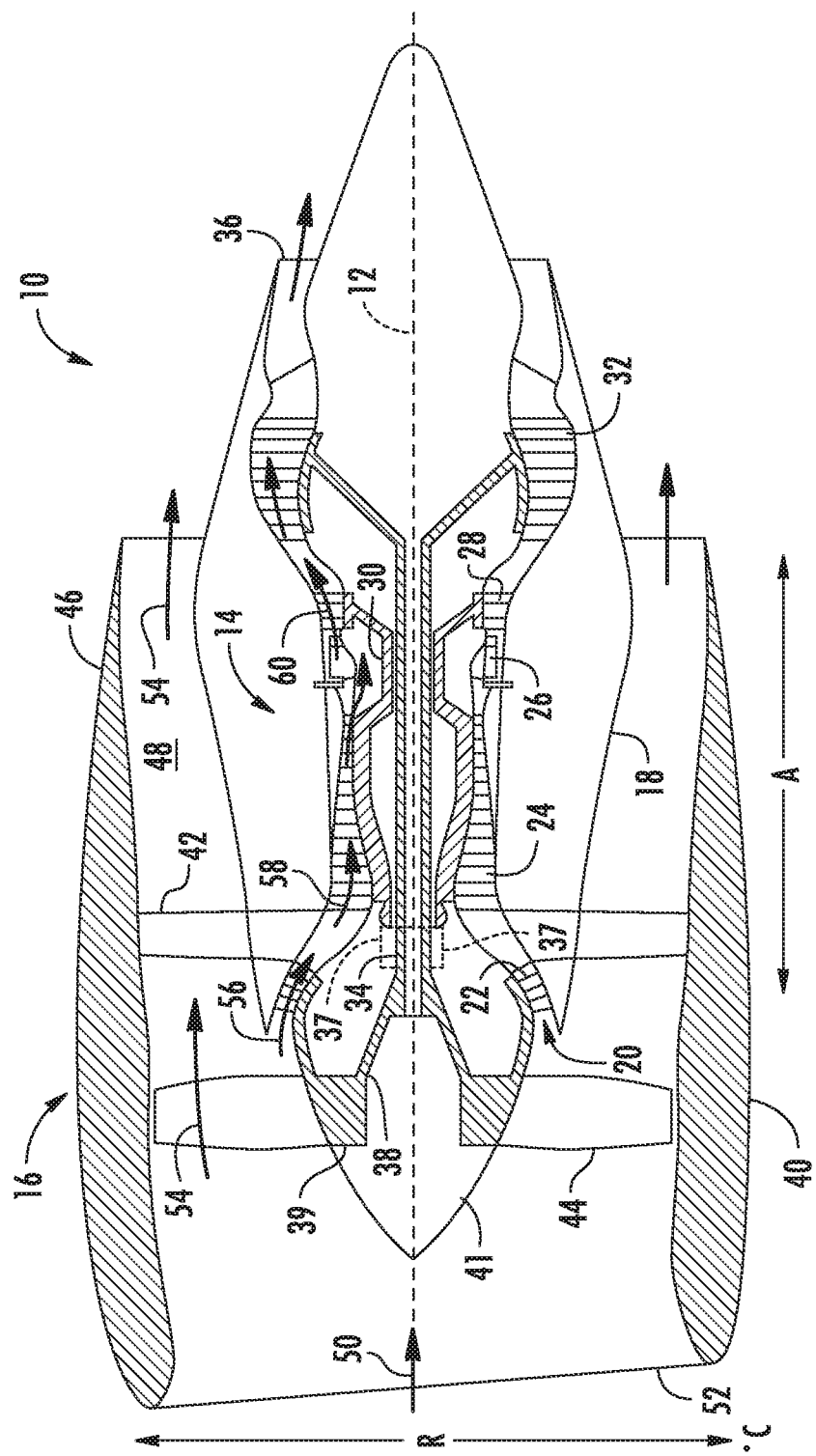
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A casing for a bearing of a gas turbine engine is generally provided. For instance, the bearing my generally support a rotating shaft of the gas turbine engine. The casing may generally be a squirrel casing including an attachment feature at a radially outermost portion of the squirrel casing, such as flange, in order to attach the squirrel casing to a static frame of the gas turbine engine. The squirrel casing further includes support arms extending from the attachment feature to a radially innermost portion of the squirrel casing. One or more, such as all, of the support arms may define internal cavities. Moreover, one or more reinforcing members may be at least partially house, such as inserted into, the internal cavities. The reinforcing members include a shape memory alloy material. Additionally, the squirrel casing may be attached to an outer race of the bearing. As such, the squirrel casing may provide damping under compression as the support arms and reinforcing member(s) are bent, flexed, and/or deflected. For instance, the reinforcing member(s), including the shape memory alloy, may at least partially provide such damping. As such, the squirrel casing may generally allow for hysteresis damping and adaptive stiffness. Additionally, the support assembly may reduce the weight of the gas turbine engine and lead to increased efficiency. Further, by including a shape memory alloy, the support assembly may allow for backup damping in a no-oil condition. Additionally, the placement of the squirrel casing may prevent or reduce bearing coning and thereby enhance the bearing performance.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular nacelle 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the nacelle 40 may be configured to be supported relative to the core engine 14 by a plurality of substantially radially-extending, circumferentially-spaced outlet guide vanes 42. As such, the nacelle 40 may enclose the fan rotor 38 and its corresponding fan rotor blades (fan blades 44). Further, as shown, each of the fan blades 44 may extend between a root and a tip in the radial direction R relative to the centerline 12. Moreover, a downstream section 46 of the nacelle 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the nacelle 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
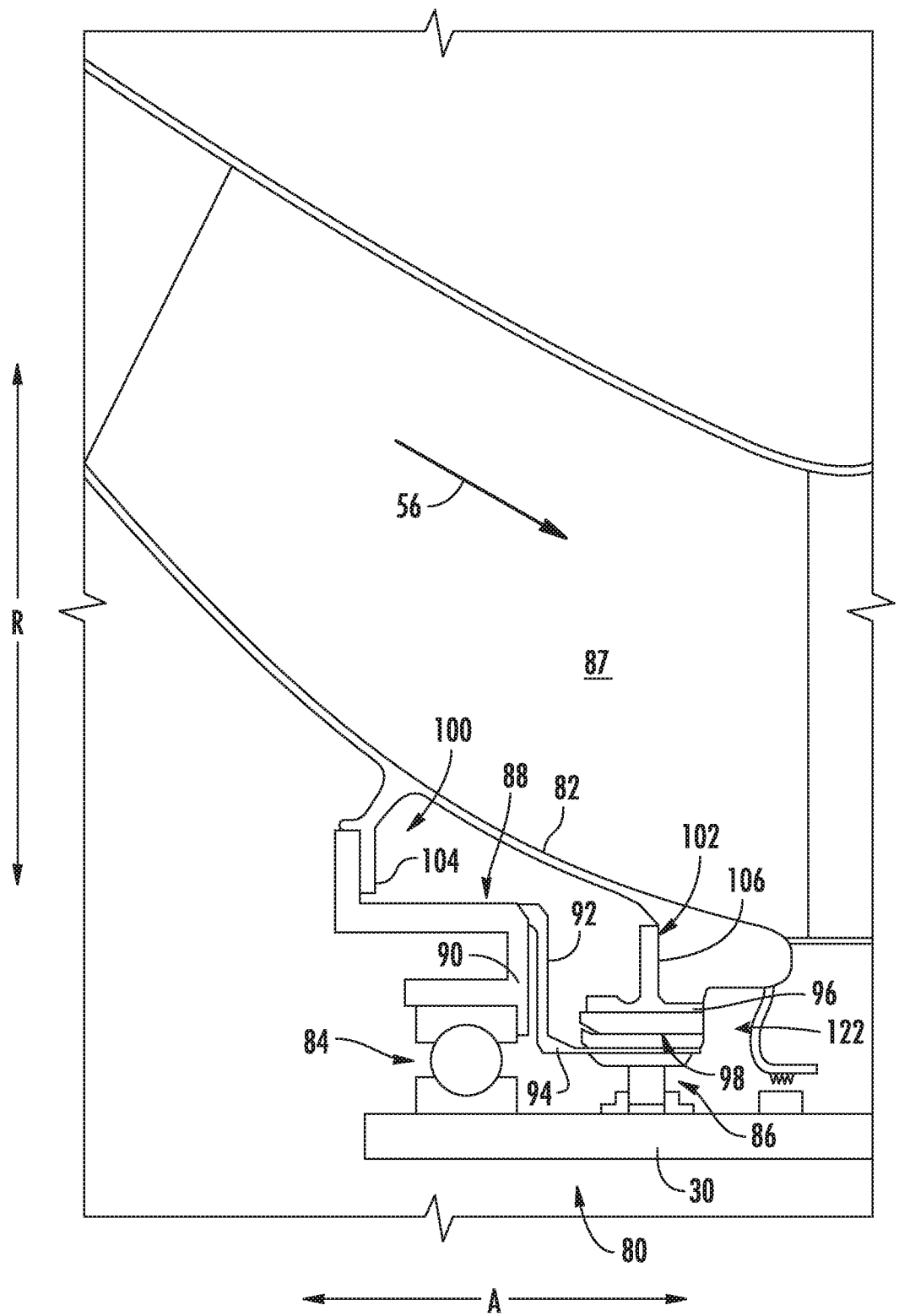
FIG. 2 illustrates a cross-sectional view of the compressor section of FIG. 1 in accordance with aspects of the present subject matter, particularly illustrating a forward end of a high pressure shaft.

Referring now to FIG. 2, a close-up view of a cross-section of the compressor section of the gas turbine engine 10 of FIG. 1 is provided. Specifically, FIG. 2 shows a forward end 80 of the HP shaft 30. The forward end 80 of the HP shaft 30 is positioned within the compressor section of the turbine engine 10, radially inward of a core air flowpath 87 for the second compressed airflow 56 flowing through the core engine 14. Notably, for the depicted embodiment, the core air flowpath 87 is defined at least in part by a static frame 82 within the compressor section of the gas turbine engine 10. For the illustrated embodiment, the static frame 82 is configured as a single piece unit. However, in some other embodiments, the static frame 82 may instead be formed of a plurality of members attached and configured in any suitable manner.

Still referring to the exemplary embodiment of FIG. 2, the turbine engine 10 includes a bearing supporting rotation of the HP shaft 30 at the forward end 80. More particularly, the gas turbine engine 10 includes a forward bearing 84 and an aft bearing 86, the forward and aft bearings 84, 86 each supporting rotation of the HP shaft 30 at the forward end 80 of the HP shaft 30. In these embodiments, the bearing(s) is a load-bearing unit designed to bear the load of the shaft 30. In the illustrated embodiment, the forward bearing 84 is configured as a thrust bearing including a ball bearing, and the aft bearing 86 is configured as a roller bearing including a roller element bearing. It should be appreciated however that in other embodiments, the forward and/or aft bearings 84, 86 may instead have any other suitable form or configuration. Further, in some other embodiments, the gas turbine engine 10 may only include a single bearing for supporting the forward end 80 of the HP shaft 30. Additionally, it should be appreciated that FIG. 2 is provided only to place the subject matter in an exemplary field of use, and the bearing(s) 84, 86 may be included at any other position along the HP shaft 30, along the LP shaft 34 (FIG. 1), or any other suitable rotating shaft of the gas turbine engine 10 or other suitable gas turbine engine.

The gas turbine engine 10 may additionally include a support element 88 supporting the bearing, e.g., supporting either or both the forward bearing 84 and the aft bearing 86. More particularly, the support element 88 depicted includes a plurality of individual ribs spaced along a circumferential direction C (see, for example, FIG. 4). The plurality of ribs may include forward bearing support ribs 90 and aft bearing support ribs 92. In the embodiment shown in FIG. 2, the support element 88 is configured as a "squirrel casing" for the forward and aft bearings 84, 86. However, in other embodiments, the gas turbine engine may include multiple squirrel casings, such as one squirrel casing for each bearing. Additionally, the aft bearing support ribs 92 may include an axial member 94 extending generally along the axial direction A for supporting the aft bearing 86. The ribs 90, 92 of the support element 88 may be formed of a material (e.g., a metal) capable of bending or flexing during operation of the gas turbine engine 10 to provide a certain amount of damping for the forward and aft bearings 84, 86.

Figure 3:
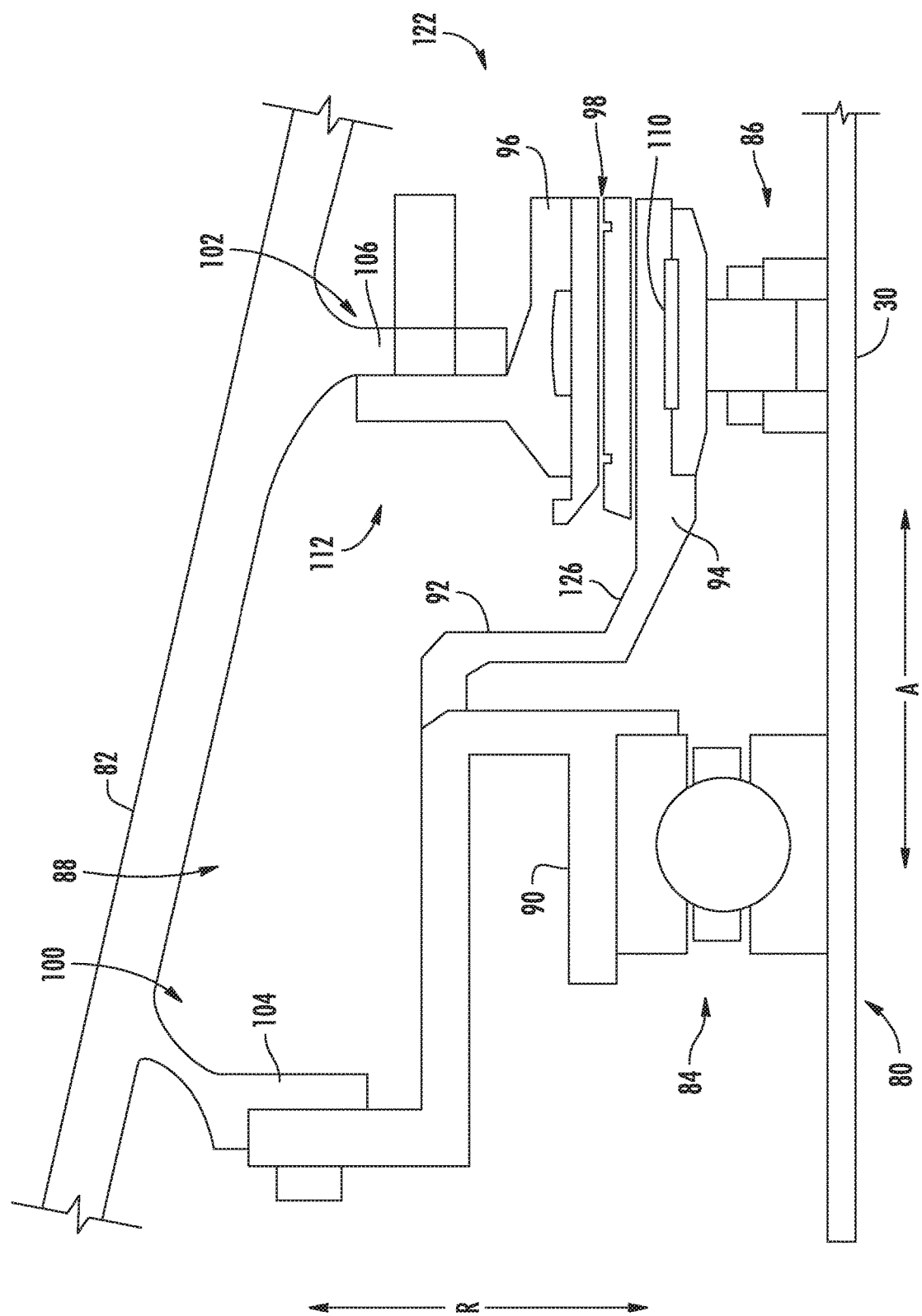
FIG. 3 illustrates a close-up view of one embodiment of forward and aft bearings of FIG. 2 in accordance with aspects of the present subject matter.

FIG. 3 provides a close-up view of one embodiment of the forward and aft bearings 84, 86 of FIG. 2. In FIG. 3, the gas turbine engine 10 may further include a damper 112 that may include a squeeze film damper 96 for providing damping of the aft bearing 86. The squeeze film damper 96 receives a flow of fluid such as lubrication oil during operation. The squeeze film damper 96 provides such fluid to a support surface 98 to generate a thin film of such fluid. Dynamic forces acting on the HP shaft 30 and aft bearing 86 may be absorbed or dampened by squeezing out the fluid on the support surface 98. Notably, the support element 88 is attached to the static frame 82 at a first location 100, and, for the embodiment depicted, the squeeze film damper 96 is attached to the static frame 82 at a second location 102. More particularly, for the depicted embodiment, the support element 88 is attached directly, without any intervening components, to a first attachment flange 104 of the static frame 82 at the first location 100, and the squeeze film damper 96 is attached directly to a second attachment flange 106 of the static frame 82 at the second location 102. The first location 100 is spaced from the second location 102. Specifically, for the embodiment depicted, the first location 100 is spaced from the second location 102 at least as far as the forward bearing 84 is spaced from the aft bearing 86. However, in other embodiments (see FIGS. 4-8) one support element 88 may be attached at one location of the static frame 82 to support a single bearing, or, alternatively, each of the forward and aft bearings 84, 86 may include separate support element 88 attached to the first and second attachment flanges 104, 106 respectively. Additionally, though the squeeze film damper 96 is illustrated between the support element 88 and the static frame 82 in the embodiment of FIG. 3, it should be appreciated that in other embodiments, the squeeze film damper 96 may be arranged radially inward of the support element 88 between the support element 88 and the bearing (e.g., the aft bearing 86).

In order to further provide damping to the bearings, a support assembly 122 of the present gas turbine engine 10 may include a casing, such as a squirrel casing 126 (as described in more detail in regards to FIGS. 4-7), of the support element 88 supporting the bearing, such as the forward bearing 84 or aft bearing 86. The casing may include one or more a shape memory alloy reinforcing members 154 (see, e.g., FIGS. 4-9). In several embodiments, the support assembly 122 may further include the squeeze film damper 96 and/or other suitable dampers. As additionally shown in FIG. 3, the casing may include deflection limiter 110 positioned radially between a radially innermost portion of the casing and the outer race as described in more detail below in regard to FIGS. 6 and 7.

Figure 4:
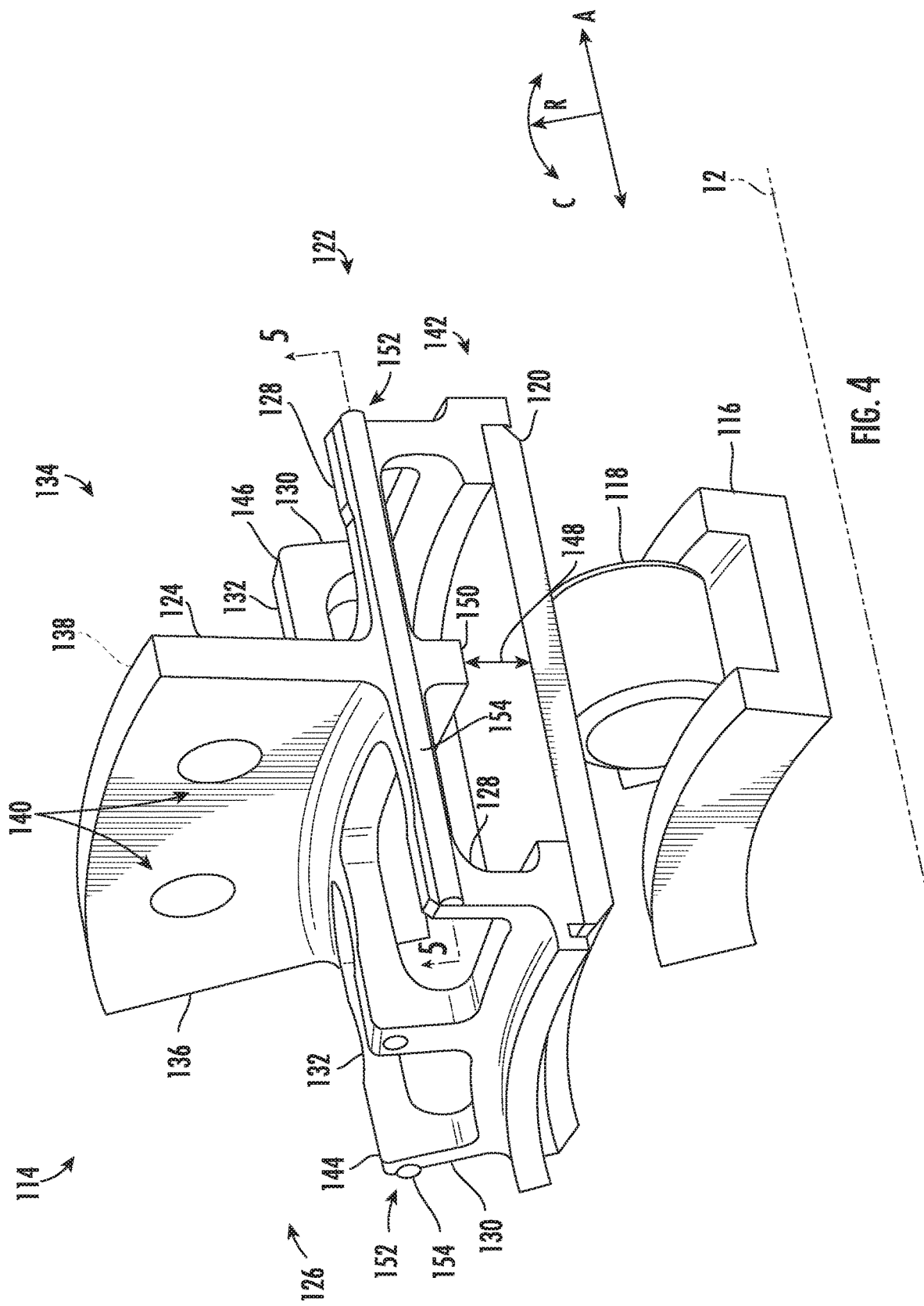
FIG. 4 illustrates a pictorial view of an embodiment of a bearing assembly in accordance with aspects of the present subject matter, particularly illustrating a section of a squirrel casing of a support assembly.
Figure 5:
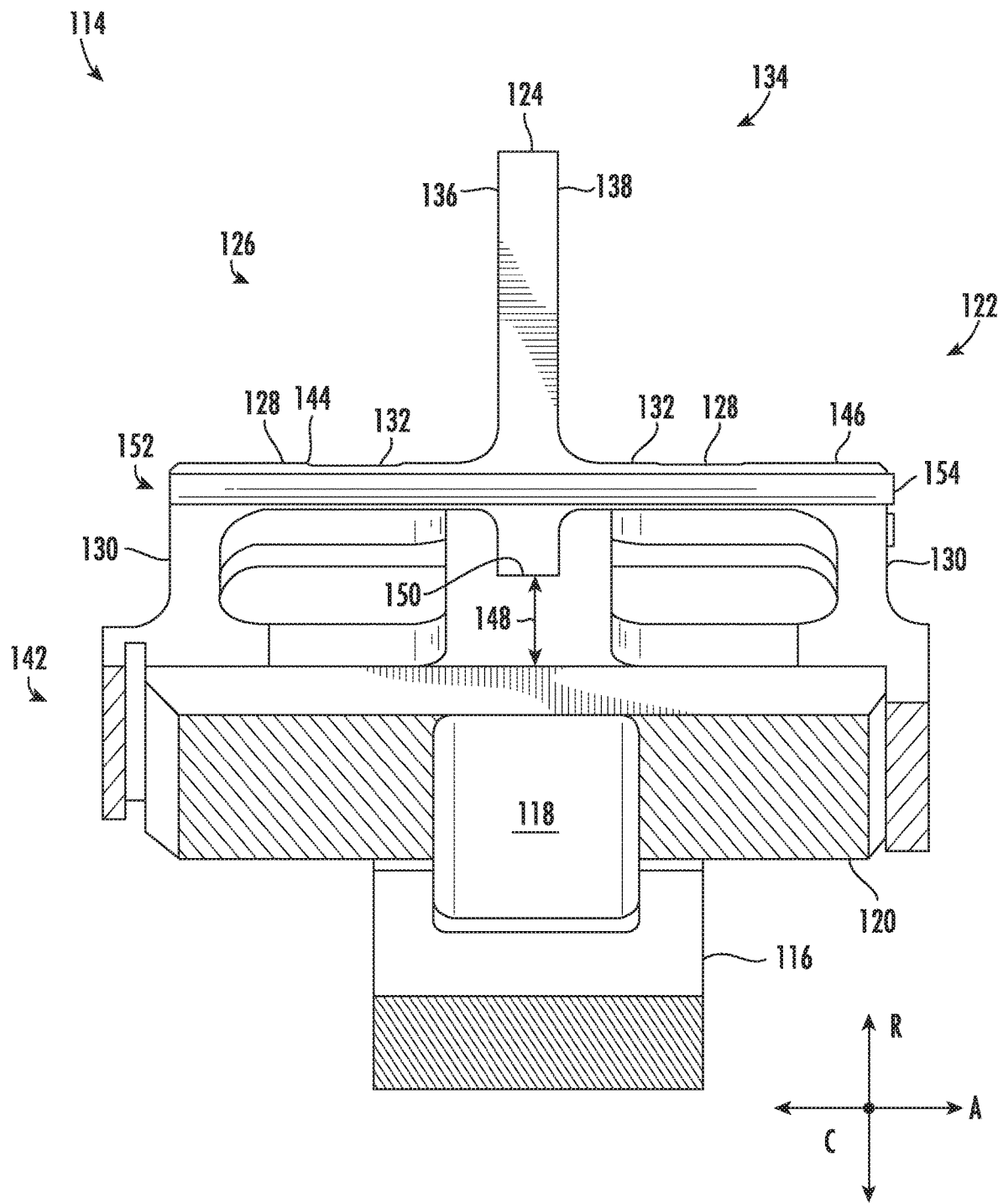
FIG. 5 illustrates a cross-section of the bearing assembly of FIG. 4 along section line 5-5 in accordance with aspects of the present subject matter.

Referring now FIGS. 4 and 5, multiple views of an embodiment of a bearing assembly 114 is illustrated in accordance with aspects of the present subject matter. FIG. 4 illustrates a pictorial view of an embodiment of the support assembly 122 of the bearing assembly 114. Particularly, FIG. 4 illustrates a section of the squirrel casing 126 of the support assembly 122. FIG. 5 illustrates a cross-section of the bearing assembly 114 of FIG. 4 along section line 5-5. Though a portion of the squirrel casing 126 is illustrated in FIGS. 4 and 5, it should be appreciated that an integral squirrel casing 126 may fully circumscribe the bearing(s) 118 in the circumferential direction C. For instance, the squirrel casing 126 may be formed as a ring. In other embodiments, it should be recognized that the squirrel casing 126 may include segments circumscribing the bearing(s) in the circumferential direction C. For instance, the squirrel casing 126 may include two or more segments arranged end to end in the circumferential direction C. The bearing assembly 114 may be utilized to support a rotating shaft (e.g. the HP or LP shafts 30, 34 not shown). Particularly, in the illustrated embodiment, the bearing assembly 114 is illustrated as supporting a roller bearing such as the aft bearing 86 of FIG. 3. However, in other embodiments, it should be appreciated that the bearing assembly 114 may be utilized to support a thrust bearing, such as forward bearing 84 of FIG. 3, or any other ball bearing(s), roller bearing(s), or any other suitable configuration of a bearing.

As shown, the bearing assembly 114 may include an inner race 116 coupled either directly or indirectly to one of the rotating shafts, not shown, of the gas turbine engine 10. For instance, the inner race 116 may be coupled to the HP or LP shaft 30, 34. As shown, a bearing 118 may be positioned radially exterior to the inner race 116 in order to support inner race 116 and thereby the rotating shaft of the gas turbine engine 10. Though one bearing 118 is illustrated in the embodiment of FIGS. 4 and 5 for convenience, it should be appreciated that a plurality of bearings 118 may be arranged between the inner and outer races 116, 120 in the circumferential direction C. Though the bearing 118 is illustrated as a roller bearing, it should be appreciated that the bearing 118 may be a ball bearing, such as a ball bearing utilized in the forward bearing 84 of FIG. 3. As shown, the bearing assembly 114 may include the outer race 120 positioned radially exterior to the bearing 118. For instance, the bearing(s) 118 may be sandwiched between the inner and outer races 116, 120 in the radial direction R. It should be appreciated that the bearing(s) 118 may allow the inner race 116 and rotating shaft to rotate with respect to the outer race 120, which may be coupled to the static frame 82 (see, e.g., FIGS. 2 and 3) through various other components of the bearing assembly 114. As such, the bearing 118 may allow such relative rotation while still supporting the inner race 116 and thus the rotating shaft and associated components of the gas turbine engine 10.

The bearing assembly 114 may further include the support assembly 122 for the bearing 118 of the gas turbine engine 10. The support assembly 122 may include the outer race 120 supporting the bearing 118. The support assembly 122 may further include the damper 112 positioned radially exterior to the outer race 120. The damper 112 may support the outer race 120 while also providing damping to the outer race 120 and thus to the bearing 118 and subsequently the rotating shaft. In several configurations, the damper 112 may include the squirrel casing 126. For instance, the squirrel casing 126 may be a component of or attached to the support element 88 (see FIGS. 2 and 3) or may be an individual component coupled directly or indirectly to the static frame 82. The squirrel casing 126 may be positioned radially exterior to the outer race 120 and support the outer race 120 and therefore the bearing 118, inner race 116, and/or the rotating shaft. It should be appreciated that the damper 112 may be directly or indirectly coupled to the outer race 120. As shown, the squirrel casing 126 may include a plurality of support arms or ribs (support arms 128). The support arm(s) 128 may generally include spring fingers, beams, curved members, or any other suitable three-dimension shape. Moreover, the support arms 128 may flex or bend during operation of the gas turbine engine 10 in order to dampen forces acting on or through the bearing(s) 118 and/or the rotating shaft. For instance, in one embodiment, the support arms 128 may correspond to the forward bearing support ribs 90 or aft bearing support ribs 92. Additionally, the support arms 128 may include one or more radially aligned fingers or rib portions (radial ribs 130). The radial ribs 130 may generally dampen forces acting through in the radial direction R. The support arms 128 may also include one or more axially aligned fingers or rib portions (axial rib 132). The axial ribs 132 may generally dampen forces acting in the axial direction A.

As shown in the embodiment of FIGS. 4 and 5, the squirrel casing 126 may include an attachment feature 124 at a radially outermost portion 134 of the squirrel casing 126. The attachment feature 124 may generally couple or fix the squirrel casing 126 either directly or indirectly to the static frame 82. For instance, the squirrel casing 126 may be attached directly to a flange 104, 106 or may be indirectly attached to the static frame 82 through one or more intermediate components (e.g., the squeeze film damper 96 or other suitable components of the damper 112). In the illustrated embodiment, the attachment feature 124 is configured as a flange. For instance, the attachment feature 124 may include an axially forward face 136 and an axially aft face 138. As shown particularly in FIG. 4, the attachment feature 124 may define a number of bore holes 140 such that the attachment feature 124 may be fastened to the static frame 82 either directly or indirectly via various intermediary components (e.g., a squeeze film damper 96) using bolts, screws, rivets, or other suitable fasteners. For example, the bore holes 140 may be defined between the axially forward face 136 and the axially aft face 138 of the attachment feature 124. Additionally, the attachment feature 124 may be otherwise coupled to the static frame 82 either directly or indirectly using other means, such as, but not limed to, via adhesion, welding, brazing, etc.

As further illustrated in reference to FIGS. 4 and 5, the support arms 128 may extend from the attachment feature 124 to a radially innermost portion 142 of the squirrel casing 126. In an embodiment of the squirrel casing 126, one more of the support arms 128 may include the axial rib(s) 132 extending from attachment feature 124, such as axially forward face 136, the axially aft face 138, or both. Further, one or more of the support arms 128 may include the radial rib(s) 130 extending from the axial rib(s) 132 to the radially innermost portion 142 of the squirrel casing 126. For instance, in an additional or alternative embodiment, each support arm 128 may include the axial rib 132 coupled to the attachment feature 124 and the radial rib 130 extending from the axial rib 132 to the radially innermost portion 142 of the squirrel casing 126. In an exemplary embodiment, the support arms 128 may further include one or more axially forward support arms 144 extending from the axially forward face 136 of the attachment feature 124 and one or more axially aft support arms 146 extending from the axially aft face 138 of the attachment feature 124. In an additional or alternative embodiment, each of the support arms 128 may be configured as an axially forward support arm 144 or an axially aft support arm 146. Additionally, each of the axially forward support arms 144 and axially aft support arms 146 may include axial ribs 132 axially aligned. For instance, the axially forward and aft support arms 144, 146 may be arranged in pairs with axially aligned axial ribs 132. Moreover, in an exemplary embodiment, the radially innermost portion 142 of the squirrel casing 126 may be coupled to the outer race 120 of the bearing assembly 114. It should be appreciated that, in other embodiments, the radially innermost portion 142 of the squirrel casing 126 may be indirectly coupled to the outer race 120 through one or more intermediary components, e.g., the squeeze film damper 96.

As illustrated in FIG. 4, the squirrel casing may define a radial gap 148 between the radially innermost portion 142 of the squirrel casing 126 and the outer race 120. For instance, the radial gap 148 may be defined between a bumper 150 at the radially innermost portion 142 of the squirrel casing 126 and the outer race 120. In the illustrated embodiment, the bumper 150 may be a part of or coupled to the attachment feature 124. However, it should be appreciated that the radial gap 148 may be defined between the bumper 150 at any part of the radially innermost portion 142 of the squirrel casing 126 and the outer race 120 and/or any other component coupled between the outer race 120 and the squirrel casing 126. Generally, forces acting through the squirrel casing 126 may cause the support arms 128 to bend, flex, and/or deflect and thereby close or reduce the radial gap 148. Furthermore, it should be appreciated that the bending, flexing, and/or deflecting of the support arms 128 may dampen forcing acting through the support arms 128 and therefore the squirrel casing 126. As such, forces acting on or through the bearing(s) 118 may also be dampened.

Still referring to the exemplary embodiment of FIGS. 4 and 5, one or more of the support arms 128 may define an internal cavity 152. For example, the internal cavity(ies) 152 may be defined within the support arm(s) 128 while forming the support arm(s) 128 and/or may be machined within the support arm(s) 128. As shown, the internal cavity(ies) 152 may be defined at least partially within the axial rib(s) 132 of the support arm(s) 128. For example, the internal cavity(ies) 152 may be defined through at least a portion of the axial rib(s) 132 of one or more of the axially forward support arms 144 and/or the axially aft support arms 146. Moreover, in an additional or alternative embodiment, as shown, each of the support arms 128 may define an internal cavity 152, such as an internal cavity extending through at least a portion of the axial ribs 132. Furthermore, when the axial ribs 132 of the support arms 128 are axially aligned in pairs, each pair of axially forward support arms 144 and axially aft support arms 146 may define the internal cavity 152 extending through the axial rib 132 of the axially forward support arm 144, the attachment feature 124, and/or the axial rib 132 of the axially aft support arm 146. For example, the internal cavity 152 may be defined through the entire axial length of each support arm pair 144, 146.

As depicted in the exemplary embodiment, the squirrel casing 126 may include a reinforcing member 154 at least partially housed within the internal cavity 152 of one or more of the support arms 128. For instance, each support arm 128 may at least partially house a reinforcing member 154. In an additional or alternative embodiment, a single reinforcing member 154 may be at least partially housed within the internal cavity 152 of each pair of axially forward support arms 144 and axially aft support arms 146. For instance, the reinforcing members 154 may extend though the axial ribs 132 of each pair of support arms 144, 146 and/or the attachment feature 124. The body of the squirrel casing 126 may generally include a first material different than a second material of the reinforcing members 154. In a certain embodiment, the squirrel casing 126 may be formed from a metal (e.g., steel, titanium based alloys, nickel based alloys, or other suitable metals or metal alloys), composite, or other suitable material. The reinforcing members 154 may generally include a shape memory alloy material. Generally, the reinforcing members 154 may be used to modify the stiffness of the support arms 128. For example, reinforcing members 154 defining a higher stiffness than the material of the squirrel casing 126 may be inserted within the internal cavities 152 to increase the stiffness of the support arms 128.

In another example, reinforcing members 154 defining a lower stiffness than the material of the squirrel casing 126 may be inserted within the internal cavities 152 to decrease the stiffness of the support arms 128. In a still further example, reinforcing members 154 including a shape memory alloy material may increase and/or decrease the stiffness of the support arms 128 dependent on the operating conditions of the squirrel casing 126 as described generally below.

The reinforcing member(s) 154 may generally include one or more rods, dowels, or pins with cross-sectional shapes configured to match the cross-section of the internal cavity(ies) 152. For instance, the reinforcing members 154 are illustrated as defining circular cross-sectional shapes in the embodiment of FIG. 4. However, it should be recognized that the reinforcing members 154 may define any suitable cross-sectional shapes. For instance, one or more of the reinforcing members 154 may define a square cross-section, elliptical cross-section, a polygon cross-section including any number of sides, and/or any other suitable shape. As such, the internal cavities 152 may be configured to have the same or similar cross-sectional shapes such that the reinforcing members 154 may be received within the internal cavities 152.

Figure 6:
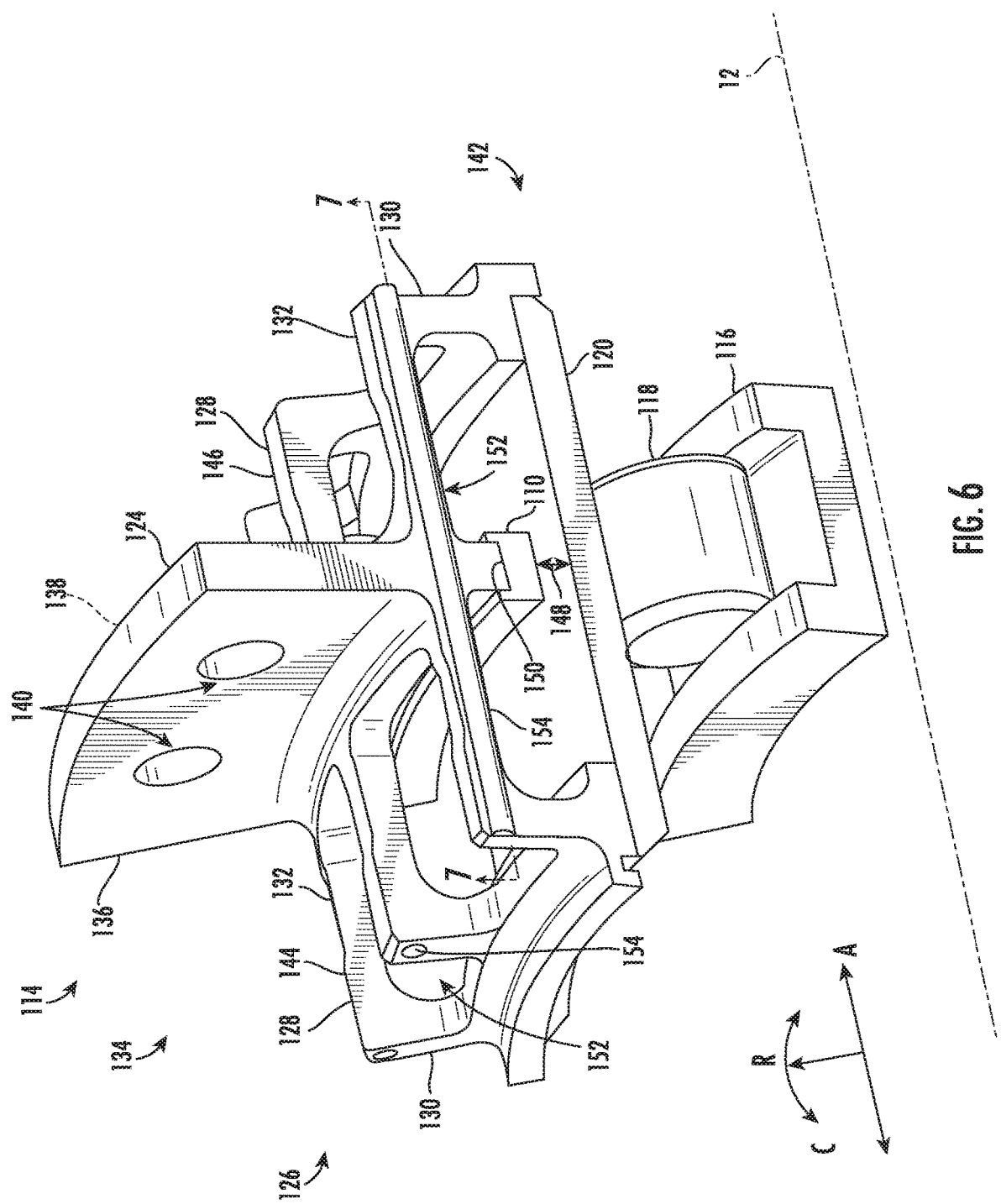
FIG. 6 illustrates a pictorial view of another embodiment of the bearing assembly in accordance with aspects of the present subject matter, particularly illustrating the support assembly including a deflection limiter.
Figure 7:
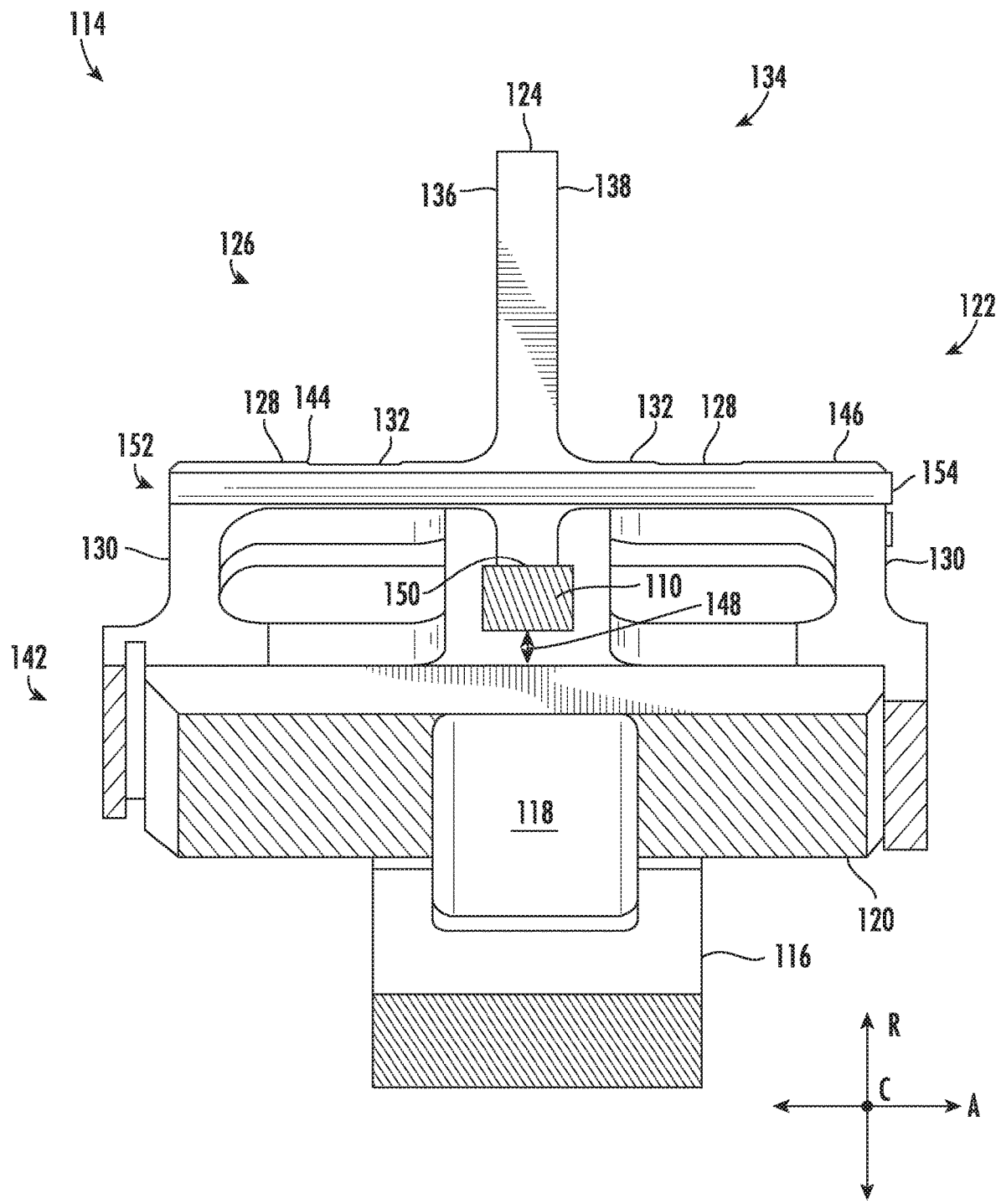
FIG. 7 illustrates a cross-section of the bearing assembly of FIG. 6 along section line 7-7 in accordance with aspects of the present subject matter.

Referring now to FIGS. 6 and 7, multiple views of an embodiment of the bearing assembly 114 are illustrated in accordance to aspects of the present subject matter. Particularly, FIGS. 6 and 7 illustrate a squirrel casing 126 of a support assembly 122 including the deflection limiter 110. For example, FIG. 6 illustrates a pictorial view of a portion of such squirrel casing 126, and FIG. 7 illustrates a cross-section of such squirrel casing 126 taken along section line 7-7 of FIG. 6. The squirrel casing 126 of FIGS. 6 and 7 may generally be configured as the squirrel casing 126 of FIGS. 4 and 5. For example, the squirrel casing 126 may include the attachment feature 124, the support arms 128 defining the internal cavities 152, the reinforcing members 154, and the bumper 150. However, in the embodiment of FIGS. 6 and 7, the squirrel casing 126 may further include the deflection limiter 110 coupled to the radially innermost portion 142 of the squirrel casing 126. For instance, the deflection limiter 110 may be coupled to the bumper 150 such that the radial gap 148 is defined between the deflection limiter 110 and the outer race 120 and/or any intermediary component arranged between the squirrel casing 126 and the outer race 120.

The deflection limiter 110 may generally bend, deform, or flex with the squirrel casing 126 to dampen loads acting on the squirrel casing 126 and therefore forces acting on or through the bearing(s) 118 and/or rotating shaft. Additionally, the deflection limiter 110 may reduce or eliminate bending, flexing, and/or deflecting of the support arms 128 once the radial gap 148 has been eliminated. In an additional or alternative embodiment, the deflection limiter 110 may also deform after the radial gap 148 has been closed. For example, forces acting on the squirrel casing 126 may close the radial gap 148 and then apply additional forces through squirrel casing 126. As such, the support arms 128 and/or deflection limiter 110 may continue to deform, bend, or flex under such additional forces and provide damping to the bearing(s) 118 and/or rotating shaft. It should be appreciated that the stiffness provided by the squirrel casing 126 may be higher once the radial gap 148 has been fully closed. The deflection limiter 110 may generally include one or more rings, a segmented ring, leaf springs, hairpin springs, corrugated springs, or any other suitable shape to reduce the deflection of the bumper 150 and provide additional stiffness to the squirrel casing 126. In several embodiments, the deflection limiter 110 may include a shape memory alloy material.

In several embodiments, the reinforcing member(s) 154 and/or deflection limiter 110 may include a shape memory alloy (SMA) material. In some embodiments, the reinforcing member(s) 154 and/or deflection limiter 110 may include the SMA material as a major constituent, in an amount greater than 50 wt. % of the reinforcing member(s) 154 and/or deflection limiter 110. In certain embodiments, the reinforcing member(s) 154 and/or deflection limiter 110 may be essentially composed of the SMA material.

A SMA is generally an alloy capable of returning to its original shape after being deformed. Further, SMAs may act as a lightweight, solid-state alternative to traditional actuators. For instance, certain SMAs may be heated in order to return a deformed SMA to its pre-deformed shape. A SMA may also provide varying stiffness, in a pre-determined manner, in response to certain ranges of temperatures. The change in stiffness of the shape memory alloy is due to a temperature related, solid state micro-structural phase change that enables the alloy to change from one physical shape to another physical shape. The changes in stiffness of the SMA may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of the reinforcing member(s) 154 and/or deflection limiter 110 intended to change stiffness during operation of the support assembly 122, the reinforcing member(s) 154 and/or deflection limiter 110 may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the reinforcing member(s) 154 and/or deflection limiter 110 has a first stiffness at a first temperature and has a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Exemplary, but non-limiting examples of SMAs that may be suitable for forming the reinforcing member(s) 154 and/or deflection limiter 110 may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a nickel-aluminum based alloys, copper-aluminum-nickel alloy, or alloys containing zinc, copper, gold, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMAs may also display superelasticity. Superelasticity may generally be characterized by recovery of large strains, potentially with some dissipation. For instance, martensite and austenite phases of the SMA may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

Figure 8:
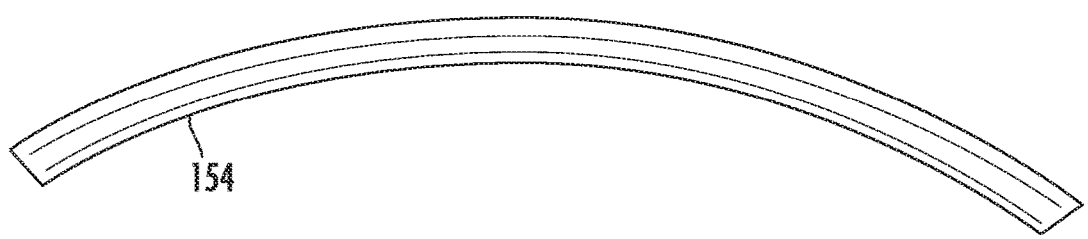
FIG. 8 illustrates a view of a reinforcing member in accordance with aspects of the present subject matter, particularly illustrating the reinforcing member in a unstressed state.
Figure 9:
FIG. 9 illustrates another view of the reinforcing member of FIG. 8 in accordance with aspects of the present subject matter, particularly illustrating the reinforcing member in a pre-stressed state.

Referring now to FIGS. 8 and 9, multiple view of a reinforcing member 154 are illustrated in accordance with aspects of the present subject matter. Particularly, FIG. 8 illustrates a reinforcing member 154 in an unstressed state 156, and FIG. 9 illustrates the reinforcing member 154 in a pre-stressed state 158. For instance, in certain embodiments, FIG. 8 illustrates a curved reinforcing member 154 before insertion within the squirrel casing 126. Further, FIG. 9 illustrates the same curved reinforcing member 154 inserted within a straight or approximately straight internal cavity 152 (see, e.g., FIGS. 4-7). It should be appreciated that inserting a curved reinforcing member 154, such as a rod, within a straight internal cavity 152 may introduce stress into the unstressed state 156 and thus create a pre-stressed reinforcing member 154 (e.g., a reinforcing member 154 in the pre-stressed state 158 as shown in FIG. 9).

In general, the reinforcing member(s) 154 and/or deflection limiter 110 in the pre-stressed state 158 may shift the hysteresis cycle of the shape memory alloy reinforcing member(s) 154 and/or deflection limiter 110 to a range of stresses that is different from that of a non-pre-stressed reinforcing member(s) 154 and/or deflection limiter 110. The pre-stressing may further serve to maximize the damping function of the shape memory alloy reinforcing member(s) 154 and/or deflection limiter 110 so that the material is active at the maximum stresses generated. More particularly, placing the reinforcing member(s) 154 and/or deflection limiter 110 in the pre-stressed state 158 may allow for the reinforcing member(s) 154 and/or deflection limiter 110 to enter a hysteretic bending regime, without requiring a relatively large amount of displacement. For instance in certain embodiments, the reinforcing member(s) 154 and/or deflection limiter 110 may be prestressed between 70 GPa and 150 GPa.

Figure 10:
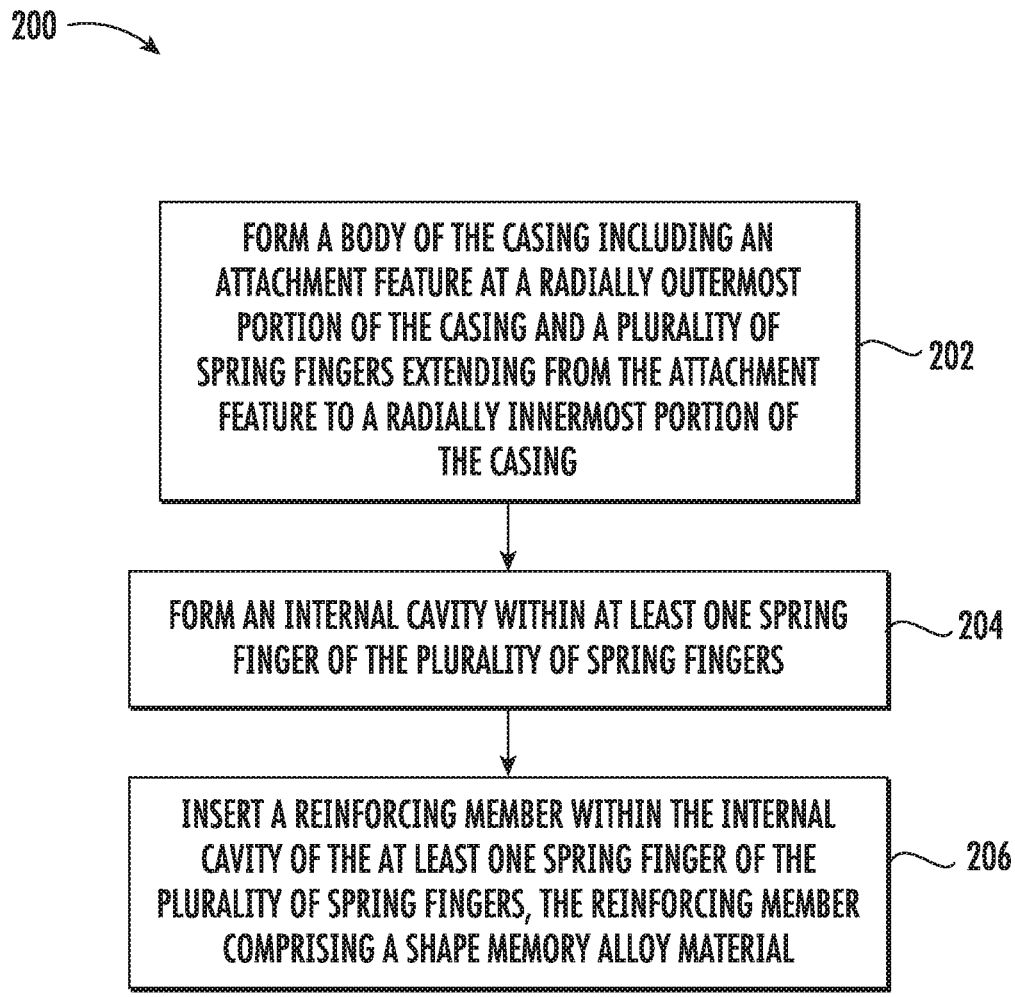
FIG. 10 illustrates a flow diagram of an embodiment of a method of forming a squirrel casing for a gas turbine engine in accordance with aspects of the present disclosure.

Referring now to FIG. 10, a flow diagram of one embodiment of a method 200 of forming a casing for a gas turbine engine is illustrated in accordance with aspects of the present disclosure. In general, the method 200 will be described herein with reference to the gas turbine engine 10 and squirrel casing 126 described above in reference to FIGS. 1-9. However, it should be appreciated by those of ordinary skill in the art that the disclosed method 200 may generally be utilized to form any suitable casing in connection with any gas turbine engine having any suitable configuration and/or any system having any suitable configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 200 may include (202) forming a body of the casing including an attachment feature 124 at a radially outermost portion 134 of the casing and a plurality of support arms 128 extending from the attachment feature 124 to a radially innermost portion 142 of the casing. The method 200 may further include (204) forming an internal cavity 152 within at least one support arm 128 of the plurality of support arms 128. For example, the internal cavity 152 may be bored or otherwise machined within the casing. In another example, the internal cavity 152 may be defined and formed within the casing simultaneously with forming the body of the casing. The method 200 may further include (206) inserting a reinforcing member 154 within the internal cavity 152 of the at least one support arm 128 of the plurality of support arms 128. Additionally, the reinforcing member 154 may include a shape memory alloy material.

In one embodiment, the method 200 may include forming a curved reinforcing member 154. In such an embodiment, inserting the curved reinforcing member 154 within the internal cavity 152 may prestress the reinforcing member 154. In an additional or alternative embodiment, the method 200 may further include coupling a deflection limiter 110 to the radially innermost portion 142 of the casing. Additionally, the deflection limiter 110 may include a shape memory alloy material.

In an exemplary embodiment of the method 200, the method 200 may further include forming an internal cavity 152 within each support arm 128 of the plurality of support arms 128. In such an embodiment, the method 200 may further include inserting a reinforcing member 154 within the internal cavity 152 of each support arm 128 of the plurality of support arms 128. Further, each reinforcing member 154 may include a shape memory alloy material.

In general, the exemplary embodiments of the support assembly 122, such as the casing and/or squirrel casing 126, described herein may be manufactured or formed using any suitable process. For instance, the squirrel casing 126 may be cast, stamped or formed from laser electric discharge machining (EDM), milled, etc. However, in accordance with several aspects of the present subject matter, the squirrel casing 126 may be formed using an additive-manufacturing process, such as a 3D printing process, or via casting. The use of such processes may allow the squirrel casing 126 to be formed integrally and/or integrally with other components of the support assembly 122, as a single monolithic component, or as any suitable number of sub-components. Forming the squirrel casing 126 via additive manufacturing may allow the support arms 128 to be integrally formed and include a variety of features not possible when using prior manufacturing methods. For example, the additive manufacturing methods described herein enable the manufacture of the support arms 128 and/or the reinforcing member(s) 154 having any suitable size and shape with one or more configurations, some of these novel features are described herein. For instance, the geometry of the squirrel casing 126 and associated structures depicted in FIGS. 4-9 may be produced via additive manufacturing methods. Additionally, it should be appreciated the internal cavity(ies) 152 may be defined within the support arms 128 while the squirrel casing 126 is formed using the additive manufacturing process.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, in various embodiments of the reinforcing member 154 and/or the deflection limiter 110 described herein, the material may include an SMA material. Further, in accordance with other exemplary embodiments of the present subject matter, the additively manufactured components described herein may be formed at least in part of materials including but not limited to pure metals, nickel alloys, chrome alloys, titanium, titanium alloys, magnesium, magnesium alloys, aluminum, aluminum alloys, iron, iron alloys, stainless steel, nickel or cobalt based super alloys (e.g., those available under the name Inconel® available from Special Metals Corporation), as well as SMA materials described herein. These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the squirrel casing 126 as well as components of the support assembly 122, such as the reinforcing member 154 and/or the deflection limiter 110. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together forms the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the squirrel casing 126 described herein. For example, such components may include thin additively manufactured layers and structures, such as the support arms 128 and/or the reinforcing members 154. In addition, the additive manufacturing process enables the manufacture of a single component having different materials such that different portions of the component may exhibit different performance characteristics, such as forming all or part of the reinforcing member(s) 154 from a SMA material. The successive, additive nature of the manufacturing process enables the construction of these novel features. As a result, the support assembly 122 and/or the squirrel casing 126 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A casing for a bearing of a gas turbine engine including a shaft extending along an axial direction, the casing comprising an attachment feature at a radially outermost portion of the casing, the attachment feature configured to be coupled to a static frame of the gas turbine engine; a plurality of support arms extending from the attachment feature to a radially innermost portion of the casing, at least one support arm of the plurality of support arms defining an internal cavity, wherein the radially innermost portion of the casing is configured to be coupled to an outer race of the bearing; and a reinforcing member housed at least partially within the internal cavity of at least one support arm, wherein the reinforcing member comprises a shape memory alloy material.

2. The casing of any preceding clause, wherein at least one support arm of the plurality of support arms includes an axial rib portion, and wherein the internal cavity of the at least on support arm is defined at least partially within the axial rib portion.

3. The casing of any preceding clause, wherein the at least one support arm of the plurality of support arms includes a radial rib portion extending from the axial rib portion to the radially innermost portion of the casing.

4. The casing of any preceding clause, wherein the plurality of support arms includes at least one axially forward support arm extending from an axially forward face of the attachment feature and at least one axially aft support arm extending from an axially aft face of the attachment feature, each of the axially forward and axially aft support arms including axial rib portions axially aligned.

5. The casing of any preceding clause, wherein the internal cavity is defined through at least a portion of the axial rib portion of at least one of the axially forward support arm or axially aft support arm.

6. The casing of any preceding clause, wherein the internal cavity is defined through the axial rib portion of the axially forward support arm, the attachment feature, and the axial rib portion of the axially aft support arm.

7. The casing of any preceding clause, wherein the casing further comprises a deflection limiter coupled to the radially innermost portion of the casing, the deflection limiter comprising a shape memory alloy material.

8. The casing of any preceding clause, wherein the reinforcing member is prestressed.

9. The casing of any preceding clause, wherein each of the plurality of support arms comprises an axially forward support arm extending from an axially forward face of the attachment feature or an axially aft support arm extending from an axially aft face of the attachment feature, each of the axially forward support arms and axially aft support arms including axial rib portions axially aligned, and wherein each pair of axially forward support arms and axially aft support arms defines an internal cavity extending through the axial rib portion of the axially forward support arm, the attachment feature, and the axial rib portion of the axially aft support arm.

10. The casing of any preceding clause, wherein the casing further comprises a plurality of reinforcing members, each reinforcing member of the plurality of reinforcing members at least partially housed within the internal cavity of each pair of axially forward support arms and axially aft support arms.

11. A support assembly for a bearing of a gas turbine engine including a shaft extending along an axial direction, the support assembly comprising an outer race positioned radially exterior to the bearing such that the outer race supports the bearing; and a casing positioned radially exterior to the outer race and supporting the outer race, the casing comprising an attachment feature at a radially outermost portion of the casing, the attachment feature coupled to a static frame of the gas turbine engine; a plurality of support arms extending from the attachment feature to a radially innermost portion of the casing, at least one support arm of the plurality of support arms defining an internal cavity, wherein the radially innermost portion of the casing is coupled to the outer race of the bearing; and a reinforcing member housed at least partially within the internal cavity of at least one support arm, wherein the reinforcing member comprises a shape memory alloy material.

12. The support assembly of any preceding clause, wherein the support assembly further comprises a squeeze film damper.

13. The support assembly of any preceding clause, wherein the bearing comprises at least one of a thrust bearing or a roller bearing.

14. The support assembly of any preceding clause, wherein each of the plurality of support arms comprises an axially forward support arm extending from an axially forward face of the attachment feature or an axially aft support arm extending from an axially aft face of the attachment feature, each of the axially forward support arms and axially aft support arms including axial rib portions axially aligned, and wherein each pair of axially forward support arms and axially aft support arms defines an internal cavity extending through the axial rib portion of the axially forward support arm, the attachment feature, and the axial rib portion of the axially aft support arm.

15. The support assembly of any preceding clause, wherein the casing further comprises a plurality of reinforcing members, each reinforcing member of the plurality of reinforcing members at least partially housed within the internal cavity of each pair of axially forward support arms and axially aft support arms.

16. The support assembly of any preceding clause, wherein the support assembly further comprises a deflection limiter coupled between the radially innermost portion of the casing and the outer race, the deflection limiter comprising a shape memory alloy material.

17. A method of forming a casing for a gas turbine engine, the method comprising forming a body of the casing including an attachment feature at a radially outermost portion of the casing and a plurality of support arms extending from the attachment feature to a radially innermost portion of the casing; forming an internal cavity within at least one support arm of the plurality of support arms; and inserting a reinforcing member within the internal cavity of the at least one support arm of the plurality of support arms, the reinforcing member comprising a shape memory alloy material.

18. The method of any preceding clause, further comprising forming an internal cavity within each support arm of the plurality of support arms and inserting a reinforcing member within the internal cavity of each support arm of the plurality of support arms, each reinforcing member comprising a shape memory alloy material.

19. The method of any preceding clause, further comprising forming a curved reinforcing member, wherein inserting the curved reinforcing member within the internal cavity prestresses the reinforcing member.

20. The method of any preceding clause, further comprising coupling a deflection limiter to the radially innermost portion of the casing, the deflection limiter comprising a shape memory alloy material.

21. A casing for a bearing of a gas turbine engine including a shaft extending along an axial direction, the casing comprising an attachment feature at a radially outermost portion of the casing, the attachment feature configured to be coupled to a static frame of the gas turbine engine; a plurality of support arms extending from the attachment feature to a radially innermost portion of the casing; and a bumper at the radially innermost portion of the casing, the bumper defining a radial gap between the bumper and the bearing.

22. The casing of any preceding clause, wherein the casing is configured such that a load applied to the casing causes the plurality of support arms to bend and/or deflect such that a size of the radial gap is altered and thus dampens the load applied to the casing.

23. The casing of any preceding clause, wherein the radial gap is defined between the bumper and an outer race of the bearing.

24. The casing of any preceding clause, wherein at least one support arm of the plurality of support arms defining an internal cavity, wherein the radially innermost portion of the casing is configured to be coupled to an outer race of the bearing; and wherein the casing further comprises a reinforcing member housed at least partially within the internal cavity of at least one support arm, wherein the reinforcing member comprises a shape memory alloy material.

25. The casing of any preceding clause, wherein at least one support arm of the plurality of support arms includes an axial rib portion, and wherein the internal cavity of the at least on support arm is defined at least partially within the axial rib portion.

26. The casing of any preceding clause, wherein the at least one support arm of the plurality of support arms includes a radial rib portion extending from the axial rib portion to the radially innermost portion of the casing.

27. The casing of any preceding clause, wherein the plurality of support arms includes at least one axially forward support arm extending from an axially forward face of the attachment feature and at least one axially aft support arm extending from an axially aft face of the attachment feature, each of the axially forward and axially aft support arms including axial rib portions axially aligned.

28. The casing of any preceding clause, wherein the internal cavity is defined through at least a portion of the axial rib portion of at least one of the axially forward support arm or axially aft support arm.

29. The casing of any preceding clause, wherein the internal cavity is defined through the axial rib portion of the axially forward support arm, the attachment feature, and the axial rib portion of the axially aft support arm.

30. The casing of any preceding clause, wherein the casing further comprises a deflection limiter coupled to the bumper of the casing, the deflection limiter comprising a shape memory alloy material.

31. The casing of any preceding clause, wherein the reinforcing member is prestressed.

32. The casing of any preceding clause, wherein each of the plurality of support arms comprises an axially forward support arm extending from an axially forward face of the attachment feature or an axially aft support arm extending from an axially aft face of the attachment feature, each of the axially forward support arms and axially aft support arms including axial rib portions axially aligned, and wherein each pair of axially forward support arms and axially aft support arms defines an internal cavity extending through the axial rib portion of the axially forward support arm, the attachment feature, and the axial rib portion of the axially aft support arm.

33. The casing of any preceding clause, wherein the casing further comprises a plurality of reinforcing members, each reinforcing member of the plurality of reinforcing members at least partially housed within the internal cavity of each pair of axially forward support arms and axially aft support arms.

What is claimed is:

1. A casing for a bearing of a gas turbine engine including a shaft extending along an axial direction, the casing comprising:
 an attachment feature at a radially outermost portion of the casing, the attachment feature configured to be coupled to a static frame of the gas turbine engine;

a plurality of support arms extending from the attachment feature to a radially innermost portion of the casing, at least one support arm of the plurality of support arms defining an internal cavity, wherein the radially innermost portion of the casing is configured to be coupled to an outer race of the bearing; and a reinforcing member housed at least partially within the internal cavity of at least one support arm, wherein the reinforcing member comprises a shape memory alloy material.

2. The casing of claim 1, wherein at least one support arm of the plurality of support arms includes an axial rib portion, and wherein the internal cavity of the at least one support arm is defined at least partially within the axial rib portion.

3. The casing of claim 2, wherein the at least one support arm of the plurality of support arms includes a radial rib portion extending from the axial rib portion to the radially innermost portion of the casing.

4. The casing of claim 1, wherein the plurality of support arms includes at least one axially forward support arm extending from an axially forward face of the attachment feature and at least one axially aft support arm extending from an axially aft face of the attachment feature, each of the axially forward and axially aft support arms including axial rib portions axially aligned.

5. The casing of claim 4, wherein the internal cavity is defined through at least a portion of the axial rib portion of at least one of the axially forward support arm or axially aft support arm.

6. The casing of claim 4, wherein the internal cavity is defined through the axial rib portion of the axially forward support arm, the attachment feature, and the axial rib portion of the axially aft support arm.

7. The casing of claim 1, wherein the casing further comprises:
a deflection limiter coupled to the radially innermost portion of the casing, the deflection limiter comprising a shape memory alloy material.

8. The casing of claim 1, wherein the reinforcing member is prestressed.

9. The casing of claim 1, wherein each of the plurality of support arms comprises an axially forward support arm extending from an axially forward face of the attachment feature or an axially aft support arm extending from an axially aft face of the attachment feature, each of the axially forward support arms and axially aft support arms including axial rib portions axially aligned, and wherein each pair of axially forward support arms and axially aft support arms defines an internal cavity extending through the axial rib portion of the axially forward support arm, the attachment feature, and the axial rib portion of the axially aft support arm.

10. The casing of claim 9, wherein the casing further comprises:
a plurality of reinforcing members, each reinforcing member of the plurality of reinforcing members at least partially housed within the internal cavity of each pair of axially forward support arms and axially aft support arms.

11. A support assembly for a bearing of a gas turbine engine including a shaft extending along an axial direction, the support assembly comprising:
an outer race positioned radially exterior to the bearing such that the outer race supports the bearing; and
a casing positioned radially exterior to the outer race and supporting the outer race, the casing comprising:

an attachment feature at a radially outermost portion of the casing, the attachment feature coupled to a static frame of the gas turbine engine;
a plurality of support arms extending from the attachment feature to a radially innermost portion of the casing, at least one support arm of the plurality of support arms defining an internal cavity, wherein the radially innermost portion of the casing is coupled to the outer race of the bearing; and
a reinforcing member housed at least partially within the internal cavity of at least one support arm, wherein the reinforcing member comprises a shape memory alloy material.

12. The support assembly of claim 11, wherein the support assembly further comprises a squeeze film damper.

13. The support assembly of claim 11, wherein the bearing comprises at least one of a thrust bearing or a roller bearing.

14. The support assembly of claim 11, wherein each of the plurality of support arms comprises an axially forward support arm extending from an axially forward face of the attachment feature or an axially aft support arm extending from an axially aft face of the attachment feature, each of the axially forward support arms and axially aft support arms including axial rib portions axially aligned, and wherein each pair of axially forward support arms and axially aft support arms defines an internal cavity extending through the axial rib portion of the axially forward support arm, the attachment feature, and the axial rib portion of the axially aft support arm.

15. The support assembly of claim 14, wherein the casing further comprises:
a plurality of reinforcing members, each reinforcing member of the plurality of reinforcing members at least partially housed within the internal cavity of each pair of axially forward support arms and axially aft support arms.

16. The support assembly of claim 11, wherein the support assembly further comprises:
a deflection limiter coupled between the radially innermost portion of the casing and the outer race, the deflection limiter comprising a shape memory alloy material.

17. A method of forming a casing for a gas turbine engine, the method comprising:
forming a body of the casing including an attachment feature at a radially outermost portion of the casing and a plurality of support arms extending from the attachment feature to a radially innermost portion of the casing;
forming an internal cavity within at least one support arm of the plurality of support arms; and
inserting a reinforcing member within the internal cavity of the at least one support arm of the plurality of support arms, the reinforcing member comprising a shape memory alloy material.

18. The method of claim 17, further comprising:
forming an internal cavity within each support arm of the plurality of support arms; and
inserting a reinforcing member within the internal cavity of each support arm of the plurality of support arms, each reinforcing member comprising a shape memory alloy material.

19. The method of claim 17, further comprising:
forming a curved reinforcing member, wherein inserting the curved reinforcing member within the internal cavity prestresses the reinforcing member.

20. The method of claim 17, further comprising:
coupling a deflection limiter to the radially innermost portion of the casing, the deflection limiter comprising a shape memory alloy material.

\* \* \* \* \*